United States Patent
Suteerawanit

(10) Patent No.: US 11,730,160 B1
(45) Date of Patent: Aug. 22, 2023

(54) ELECTRIC MULTI-CATCH RODENT TRAP

(71) Applicant: Nick Suteerawanit, Los Angeles, CA (US)

(72) Inventor: Nick Suteerawanit, Los Angeles, CA (US)

( * ) Notice: Subject to any disclaimer, the term of this patent is extended or adjusted under 35 U.S.C. 154(b) by 0 days.

(21) Appl. No.: 17/733,055

(22) Filed: Apr. 29, 2022

(51) Int. Cl.
*A01M 23/38* (2006.01)
*A01M 23/16* (2006.01)
*A01M 23/18* (2006.01)

(52) U.S. Cl.
CPC ........... *A01M 23/38* (2013.01); *A01M 23/16* (2013.01); *A01M 23/18* (2013.01)

(58) Field of Classification Search
CPC ...... A01M 23/38; A01M 23/16; A01M 23/18; A01M 23/20; A01M 23/14
USPC .......... 43/99, 98, 112, 60, 61, 64–67, 73, 74
See application file for complete search history.

(56) References Cited

U.S. PATENT DOCUMENTS

| | | | |
|---|---|---|---|
| 1,055,645 A | 3/1913 | Miller | |
| 1,074,770 A | 10/1913 | Beardsley | |
| 1,281,876 A * | 10/1918 | Taylor | A01M 23/38 43/99 |
| 2,544,730 A | 11/1947 | Schultz | |
| 2,519,783 A * | 8/1950 | Nagl | A01M 23/38 43/99 |
| 4,450,648 A * | 5/1984 | Pratscher | A01M 23/14 43/79 |
| 4,596,087 A * | 6/1986 | Pratscher | A01M 23/14 43/79 |
| 4,653,221 A * | 3/1987 | Pratscher | A01M 23/14 43/79 |
| 4,908,978 A * | 3/1990 | Zacharias | A01M 1/223 43/111 |
| 5,027,547 A | 7/1991 | Livshin | |
| 5,386,663 A * | 2/1995 | Fields | A01M 23/18 43/66 |
| 6,088,948 A | 7/2000 | Roennau | |
| 6,609,330 B1 * | 8/2003 | Heitman | A01M 1/223 43/132.1 |
| 9,253,971 B2 * | 2/2016 | Rivera | A01M 23/38 |
| 11,259,518 B2 * | 3/2022 | Kletzli | A01M 23/16 |
| 2009/0199457 A1 * | 8/2009 | Grigorov | A01M 1/026 43/99 |
| 2011/0056117 A1 * | 3/2011 | Fritzboger | A01M 31/002 43/73 |

(Continued)

FOREIGN PATENT DOCUMENTS

| | | | | |
|---|---|---|---|---|
| CN | 107182817 A | * | 9/2017 | ............... A01K 5/01 |
| CN | 107980759 A | * | 5/2018 | |

(Continued)

*Primary Examiner* — Darren W Ark
*Assistant Examiner* — Kevin M Dennis
(74) *Attorney, Agent, or Firm* — Averill, Green & Kim; Philip Y Kim; Kenneth L Green

(57) ABSTRACT

An electric rodent trap includes bait attracting rodents to climb entry ramps reaching up to entries, and a high voltage grid in a housing bottom portion to euthanize the rodents. The entries may include interior ramps sloping down and into the trap and the ramps may include a low voltage grid to stun the rodents causing them to stumble into the trap while remaining alive. A manual switch is later activated to energize the high voltage grid in the housing bottom portion to euthanize the rodents, and the dead rodents are removed.

18 Claims, 2 Drawing Sheets

(56) References Cited

U.S. PATENT DOCUMENTS

| | | | | |
|---|---|---|---|---|
| 2014/0352199 A1* | 12/2014 | Matney | ............... | A01M 23/04 43/61 |
| 2018/0084773 A1* | 3/2018 | Aldo | ................... | A01M 23/12 |
| 2019/0183107 A1* | 6/2019 | Edevold | ............... | A01M 23/12 |

FOREIGN PATENT DOCUMENTS

| | | | | |
|---|---|---|---|---|
| WO | WO-2019151875 A1 * | 8/2019 | ............. | A01K 3/00 |
| WO | WO2020192884 A1 | 10/2020 | | |

* cited by examiner

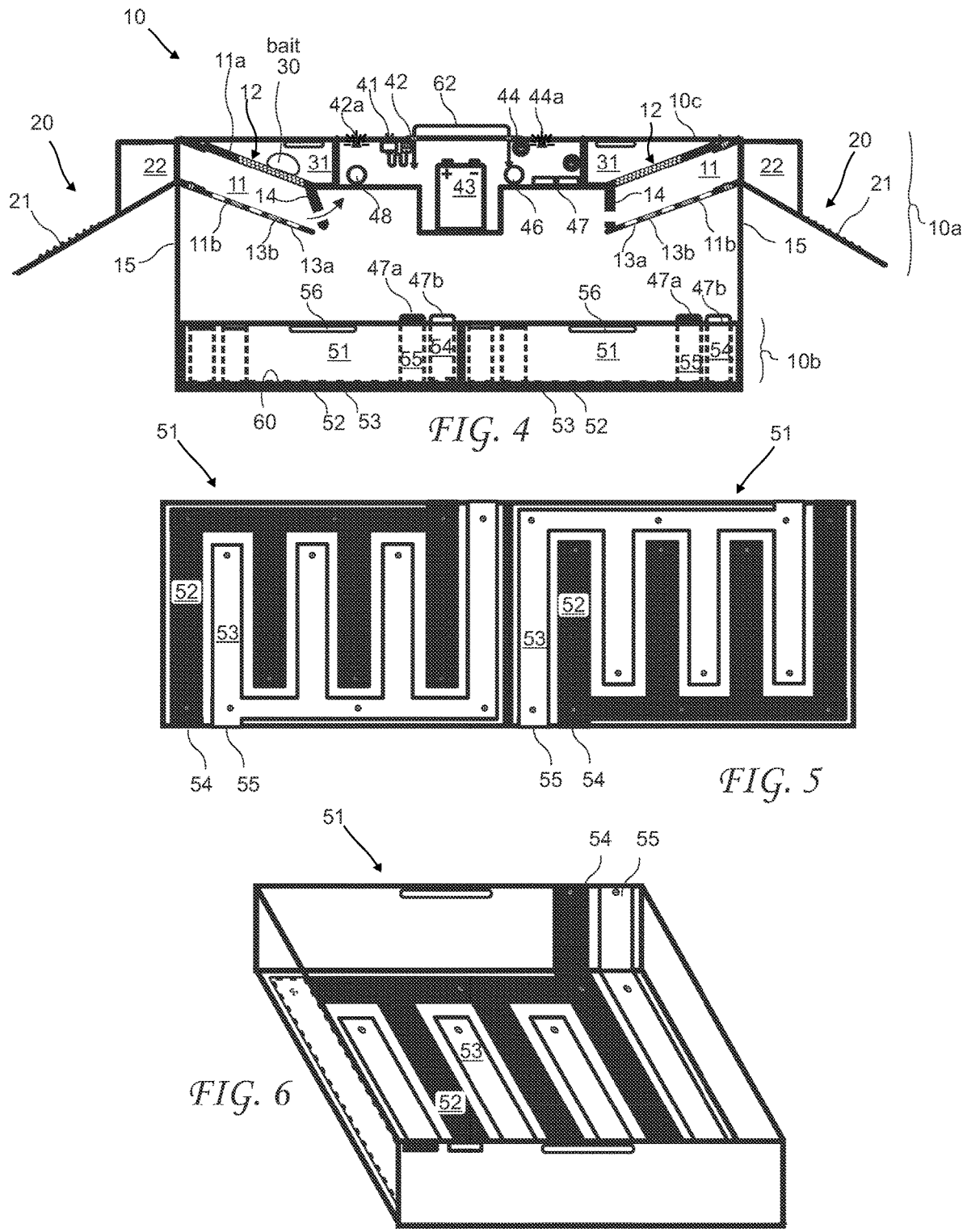

ELECTRIC MULTI-CATCH RODENT TRAP

BACKGROUND OF THE INVENTION

The present invention relates to rodent traps and in particular to an electric rodent trap capturing multiple rodent.

Rodents can be found in and around every town and farm in the United States (U.S.) and it is estimated that there is one rodent for every person living in the U.S. Rodents have followed man to almost all parts of the world. Rodents are so closely linked to humans they are called domestic rodents and humans supply their three basic needs: food; shelter; and water.

Rodents are a threat to health, and they interfere with our economic and physical well being: rodents are destructive pests and serious safety hazards; rodents start fires by gnawing on electric cables; rodents eat large amounts of food, and they contaminate even more with their urine, feces, and hair; at least 20 percent of the world's food is eaten or contaminated by rodents each year; rodents damage structures, books, furniture, even appliances, through gnawing and burrowing; rodents spread disease to humans and other animals through their bite, by transporting fleas, lice, mites and ticks, and by leaving their droppings in food and other materials that humans contact; rodents are vectors for bubonic plague, rat bite fever, leptospirosis, hantavirus, trichinosis, infectious jaundice, rat mite dermatitis, salmonellosis, pulmonary fever, and typhus. Mice have been linked to asthma; and rodents may bite babies in their cribs because the smell of milk or other food on the baby is attractive to a rat looking for food.

Rodents can be found in our homes, supermarkets, restaurants, livestock pens, and farm fields. Warehouses, grain mills, elevators, silos and corncribs are especially vulnerable to rodent infestation. Rodents will eat anything humans or livestock eat. Rats in particular are active at night and are seldom seen during the day except when populations are exceedingly large. Rodents can crawl through very small crevices, which makes it hard to confine their movement. Even if rodents are unseen, they may be heard moving after dark. A pet may be aware of a lurking rodent, however cats and dogs are not much of a deterrent to rodents.

Rodents find their way into approximately 21 million U.S. homes each winter. According to a survey by the National Pest Management Association (NPMA), nearly one-third of Americans have had a rodent problem in their home. Different types of rodents typically invade homes during the fall and winter in search of food and shelter as the climate cools, although rodents can still pose problems throughout the rest of the year. The majority of homeowners surveyed reported rodent sightings in the kitchen, as well as the basement and living room to lesser extent.

Rodent problems inside a home or business can pose a significant threat to both health and property. Various types of common rodents are known to spread *Salmonella* and other bacteria. They are also capable of triggering allergies and asthma attacks. They can also carry disease-causing parasites, such as ticks, fleas and lice. In addition to these health threats, rodents are known to damage drywall as well as wood and can also chew through electrical wires, increasing the risk of electrical fires.

Proper rodent prevention measures and awareness are essential to keep both people and property safe. Rats can squeeze through openings the size of a quarter while mice can fit through holes as small as a quarter of an inch in width. Once inside, females can breed quickly. For example, a single female mouse can have as many as twelve young every three weeks, allowing infestations to quickly grow.

Deer mice are found throughout the United States. Deer mice prefer to nest in rural areas in places like old fence posts, tree hollows and log piles. Deer mice are rarely a problem in residential settings, but they can wander indoors during the winter months while searching for shelter and food. They will often take up residence in sheds, barns or cabins during the off season. Deer mice are the most common carrier of hantavirus, a group of viruses spread by rodents that can cause kidney, blood or respiratory ailments and can sometimes be fatal in humans. The virus is transmitted primarily by the inhalation of dust particles contaminated with the urine, feces or saliva of infected deer mice.

House mice are the most commonly encountered rodent species and can be found throughout the United States. House m ice typically nest in dark, secluded areas inside of structures. They are excellent climbers and can jump up to a foot in height, allowing them to reach isolated or withdrawn areas. House mice can cause significant property damage by chewing through materials like drywall and insulation. Additionally, they have been known to spark electrical fires by gnawing on wires inside homes. House mice can also pose serious health threats, capable of contaminating stored food and spreading diseases such as *Salmonella*. House mice weight is typically 40-45 grams.

Norway rats are widespread and can be found throughout the United States. Norway rats are primarily nocturnal and often burrow into piles of garbage or underneath concrete slabs. This species tends to enter homes in the fall when outdoor food sources become scarce, typically nesting in basements, crawlspaces and other undisturbed dwellings once inside. Norway rats can cause serious property damage by gnawing through various materials, including plastic and lead pipes. They are also vectors of disease, including the plague, jaundice, rat-bite fever and cowpox virus. Additionally, this species can bring fleas and mites inside the home.

Roof rats can be found throughout the U.S. coastal states and southern third of the country. Roof rats typically live in colonies and prefer to nest in the upper areas of structures or trees. Historically, roof rats and the fleas they carry have been associated with the bubonic plague. Although cases are rare, roof rats can also spread diseases like typhus, jaundice and trichinosis.

The Black Death killed as many as 25 million people in Europe in the 1300s. Scientists believe the Black Death (also known as the Pestilence, the Great Mortality or the Plague, or bacterium *Yersinia pestis*) was a bubonic plague pandemic occurring in Afro-Eurasia from 1346 to 1353. It is the most fatal pandemic recorded in human history, causing the death of 75-200 million people in Eurasia and North Africa, peaking in Europe from 1347 to 1351. *Yersinia pestis* typically infects the Oriental rat flea, which in turn infects small rodents such as mice, rodents and squirrels. As their rodent hosts die, infected fleas seek and bite humans.

Rats are believed to perceive a small amount of ultraviolets, blues and greens and rats and mice are believed to be color blind. Yellow and green are more "attractive" to rats as they are seen as a very light grey. Rats have just two types of cones (called "dichromatic" vision): a short "blue-UV" and the middle "green" cones (Szel 1992). The "green" cones' peak sensitivity is around 510 nm (Radlwimmer 1998), but the "blue" cones are shifted toward even shorter wavelengths than human blue cones, peaking at 359 nm. As a result, rats can see into the ultraviolet, they can see colors we can't see (Jacobs et al. 1991; 2001).

The most common way to deal with rodents is using poison. However, the poison may be reached by children, and other animals eating a poisoned rodent may be affected or killed by the poison.

Some traps are capable of catching and killing multiple rodents, but a mix of sulfur dioxides, methane, and other noxious gases from the dead rodents prevent additional rodents from entering the trap.

The extensive damage caused by rodents is evidence that better traps, not requiring poison, are needed, especially traps capable to catching multiple rodents.

BRIEF SUMMARY OF THE INVENTION

The present invention addresses the above and other needs by providing an electric rodent trap including bait for attracting rodents to climb entry ramps reaching up to entries, and a high voltage grid in a housing bottom portion to euthanize the rodents. The entries may include interior ramps sloping down and into the trap and the ramps may include low voltage grids to stun the rodents causing them to stumble into the trap while remaining alive. A manual switch is later activated to energize the high voltage grid in the housing bottom portion to euthanize the rodents and the dead rodents are removed.

In accordance with one aspect of the invention, there is provided rodent trap first capturing the rodents and later euthanizing and disposing of the captured rodents. Delaying euthanizing the rodents eliminates a mix of sulfur dioxides, methane, and other noxious gases from the dead rodents, which would prevent additional rodents from entering the trap.

In accordance with another aspect of the invention, there is provided rodent trap including an entry ramp with low voltage electrodes to stun rodents causing them to fall into the trap. Delaying euthanizing the rodents eliminates a mix of sulfur dioxides, methane, and other noxious gases from the dead rodents, which would prevent additional rodents from entering the trap.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 4 is a cross-sectional view of the electric multi-catch rodent trap according to the present invention taken along line 4-4 of FIG. 3.

FIG. 5 is a top view of a pair of food trays with high voltage electrodes.

FIG. 6 is a perspective view of the food tray with the high voltage electrodes.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement, or typically within 10 percent of a stated value.

Figure 2:
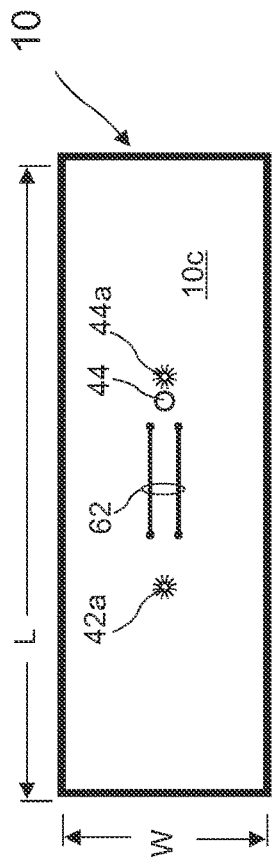
FIG. 2 is a top view of the electric multi-catch rodent trap according to the present invention.
Figure 1:
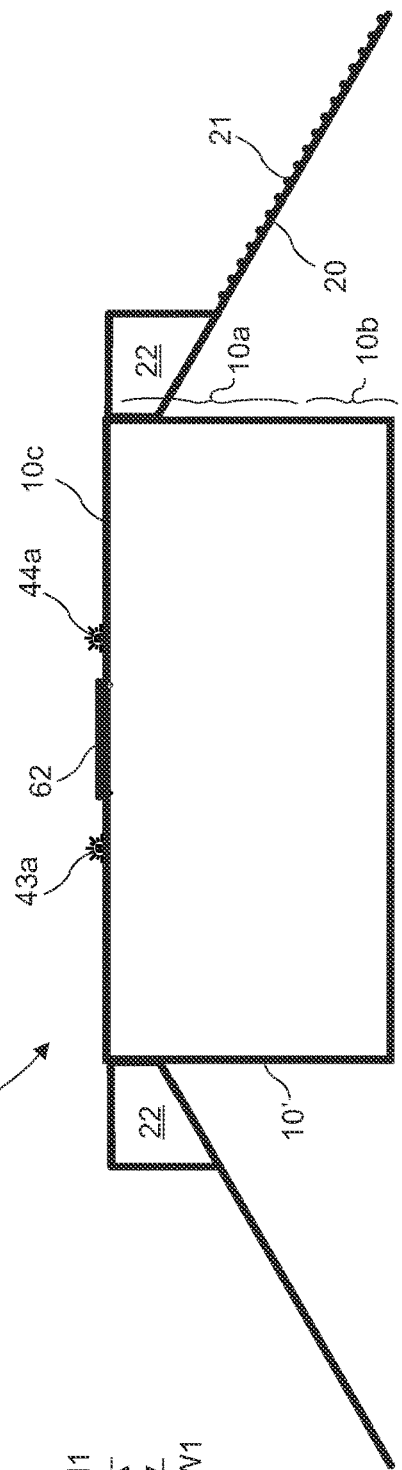
FIG. 1 is a side view of an electric multi-catch rodent trap according to the present invention.
Figure 3:
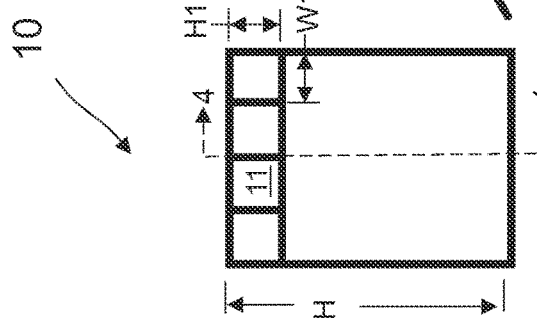
FIG. 3 is an end view of the electric multi-catch rodent trap according to the present invention.

A side view of an electric multi-catch rodent trap 10 according to the present invention is shown in FIG. 1, a top view of the trap 10 is shown in FIG. 2, and an end view of the trap 10 is shown in FIG. 3. The trap 10 includes a housing 10', a housing top portion 10a, a housing bottom portion 10b, and an opening top cover 10c. The trap 10 includes entry ramps 20 including ribs 21 facilitating rodents climbing up the entry ramps 20 to reach entries 11. Guides 22 at tops of the ramps 20 guide rodents into the entries 11. A handle 62 is provided for shipping and handling and a chain or the like may be attached to the handle 62 to prevent or reduce the chance of theft. The trap 10, not including the entry ramps 20 and guides 22, has a length L of about 36 inches, a width W of about 12 inches, and a height H of about 16 inches. The entries have heights W1 of about 3 inches and widths W1 of about 3 inches. The trap 10 shown in the drawings includes eight entries 11, four at each end, but a trap with at least one entry is intended to come within the scope of the present invention and singular language in the description is not intended t be limiting.

A cross-sectional view of the trap 10 taken along line 4-4 of FIG. 3 is shown in FIG. 4. Bait areas 31 in the housing top portion 10a contain bait 30 for attracting rodents. The entries 11 slope down and into the housing 10' starting from housing exterior walls 15. Perforations 12 in entry ceilings 11a carry odors from the bait 30 into the entries 11 to attract the rodents. Doors 14 at entry bottoms open to allow rodents to fall into the housing bottom portion 10b. Food trays 51 may be provided in the housing bottom portion 10b to contain food to further attract rodents.

The trap 10 includes a battery 43, and/or a 110/220 VAC to 12 VDC adapter 41 connecting to a 110/220 VAC power source. The adapter 41 may be electrically connected to a 12 VDC automatic charging control board 42 to charge the battery 43, and/or directly provide 12 VDC electrical power to the trap 10. An LED charging indicator 42a flashed red while the control board 42 is charging the battery 43, and blue when the battery 43 is fully charged. While a low voltage of 12 VDC is described here, those skilled in the art will recognize that a range of low voltages which stun but do not kill rodents are appropriate and a trap with other low voltages is intended to come within the scope of the present invention.

The battery 43 and/or adapter/charger 41 provide low voltage power to low voltage electrode 13a and 13b for stunning rodents, and high voltage through the high voltage amplifier 47 to electrode 52 and 53 substantially covering a housing floor 60 of the housing 10 for euthanizing rodents. A momentary switch 46 inside the housing 10', and accessible when the top cover 10c is open, switches power to the high voltage amplifier 47 to generate high voltage for electrodes 52 and 53. The high voltage amplifier 47 increases voltage for euthanizing, for example, from 12 VDC to between 20,000 VDC and 50,000 VDC.

A main ON/OFF switch 44 switches power to the low voltage electrodes 13a and 13b. An LED 44a is on when the switch 44 is ON. A switch 48 may be included inside the housing 10' in series with the ON/OFF switch 44 to switch to OFF when the top cover 10c is opened.

The inward and downward sloping entries 11 having downward sloping interior ramp floors 11b including the positive and negative low voltage (e.g., 12 VDC) electrodes 13a and 13b spaced apart on top surfaces of the interior ramp floors 11b. The low voltage is provided to the electrodes 13a and 13b when the switch 44 is ON, and the top cover 10c is closed if the switch 48 is present. Rodents entering the entry 11 are stunned by the low voltage sufficiently to stumble and fall forward and down the interior ramp floor 11b and through the door 14 into the housing bottom portion 10b. The door 14 opens from weight of the rodent, and closes after the rodent falls into the housing bottom portion 10b, and the door 14 is blocked from opening into the entry 11 prevent escape of the rodent.

A top view of a pair of food trays 51 is shown in FIG. 5 and a perspective view of the food tray 51 is shown in FIG. 6. High voltage electrodes 52 and 53 are preferably attached to the food trays 51, but are only required to reside in the housing bottom portion 10b. The high voltage electrodes 52 and 53 are electrically connected to the high voltage amplifier 47 which provide sufficient current and voltage to euthanize rodents. Connectors 54 and 55 may extend up on walls of the food trays 51 from the high voltage electrodes 52 and 53 to connect to connectors 47a and 47b connected to the high voltage amplifier 47. The food trays 51 may include handles 56 to facilitate removal.

While the invention herein disclosed has been described by means of specific embodiments and applications thereof, numerous modifications and variations could be made thereto by those skilled in the art without departing from the scope of the invention set forth in the claims.

I claim:

1. An electric rodent trap, comprising:
a housing;
a bait container inside the housing configured to contain rodent attracting bait;
an entry into the housing sloping inward and downward into the housing from housing exterior walls;
at least one entry ramp outside the housing and leading up to the entry;
a housing bottom portion of the housing;
a high voltage amplifier in the housing;
a high voltage grid in the housing bottom portion electrically connected to the high voltage amplifier;
at least one food tray in the housing bottom; and
a manual switch configured to momentarily electrically connect a high voltage electrical signal to the high voltage grid, the high voltage electrical signal sufficient to euthanize rodents in the housing bottom portion, wherein:
the high voltage grid resides on a floor of the at least one food tray in the housing bottom, the at least one food tray is configured to contain food open for consumption by rodents captured in the trap;
the at least one food tray is removable; and
positive and negative connectors extend up walls of the at least one food tray making electrical contact with housing connectors electrically when the at least one food tray is placed inside the housing, the housing connectors electrically connected to the high voltage amplifier.

2. The electric rodent trap of claim 1, wherein the entry includes a floor comprising an interior ramp sloping inward and downward into the housing.

3. The electric rodent trap of claim 2, further including a pivoting door at an interior end of the interior ramp, the pivoting door configured to pivot from an original door position into the housing to allow rodents to fall into the housing bottom portion.

4. The electric rodent trap of claim 3, wherein the pivoting door is configured to return to the original door position after the rodent falls into the housing bottom portion to block escape from the housing.

5. The electric rodent trap of claim 2, further including a low voltage electrical grid on top surfaces of interior ramp floors of the interior ramp continuously electrically connected to a low voltage signal when an ON/OFF switch is in an ON position, the low voltage signal sufficient to stun rodents on the interior ram p floors but not euthanize the rodents, the low voltage electrical grid including alternating positive and negative electrodes residing on the interior ramp floor.

6. The electric rodent trap of claim 5, wherein:
a housing top cover is configured to switch the ON/OFF switch from ON to OFF when the housing top cover is opened; and
the housing top cover is configured to switch the ON/OFF switch from OFF to ON when the housing top cover is closed.

7. The electric rodent trap of claim 2, wherein:
the entry includes an entry ceiling above the entry;
the a bait container is in a housing top portion directly above the entry ceiling; and
perforations in the entry ceiling under the bait container are configured to release bait odor downward into the entry to attract the rodents.

8. The electric rodent trap of claim 2, further including ribs on the entry ramp configured to facilitate rodents climbing the entry ramp.

9. The electric rodent trap of claim 1, wherein the manual switch is a momentary switch configured to electrically connect the high voltage electrical signal to the high voltage grid whenever the manual switch is closed.

10. The electric rodent trap of claim 2, wherein the manual switch is inside the housing accessible when a top cover of the housing is open.

11. The electric rodent trap of claim 5, wherein the low voltage signal is from a battery.

12. The electric rodent trap of claim 11, wherein the battery is in the housing.

13. The electric rodent trap of claim 5, wherein the low voltage signal and the high voltage signal are derived from an external source.

14. An electric rodent trap, comprising:
a housing;
a bait container inside the housing configured to contain rodent attracting bait;
an entry into the housing, the entry including an interior ramp sloping downward into the housing;
a low voltage power source;
a low voltage electrical grid comprising alternating positive and negative electrodes on top surfaces of interior ramp floors of the interior ramp continuously electrically connected to the low voltage power source when an ON/OFF switch is in an ON position, a low voltage signal from the low voltage power source sufficient to stun rodents on the interior ramp floors;
at least one entry ramp outside the housing and leading up to the entry;
a housing bottom portion;
a high voltage grid in the housing bottom portion;

a high voltage amplifier electrically connected to the low voltage power source, the high voltage amplifier configured to convert the low voltage signal from the low voltage power source to a high voltage electrical signal; and a momentary switch is configured to momentarily electrically connect the high voltage electrical signal from the high voltage amplifier to the high voltage grid, the high voltage electrical signal sufficient to euthanize rodents in the housing bottom portion, wherein:

the high voltage grid resides on a floor of the at least one food tray in the housing bottom, the at least one food tray is configured to contain food open for consumption by rodents captured in the trap;

the at least one food tray is removable; and positive and negative connectors extend up walls of the at least one food tray making electrical contact with housing connectors electrically when the at least one food tray is placed inside the housing, the housing connectors electrically connected to the high voltage amplifier.

15. An electric rodent trap, comprising:

a housing;

a housing bottom;

a bait container inside the housing configured to contain rodent attracting bait;

an entry into the housing, the entry including an interior ramp sloping downward into the housing;

at least one entry ramp outside the housing and leading up to the entry;

perforations in entry ceilings of the entry, the perforations configured to carry an odor from the bait into the entry;

a low voltage power source;

a low voltage electrical grid on top surfaces of interior ramp floors of the interior ramp continuously electrically connected to the low voltage power source when an ON/OFF switch is in an ON position, a low voltage signal from the low voltage power source configured to stun but not euthanize rodents on the interior ramp floors but not euthanize the rodents;

at least one removable food tray in the housing bottom;

a high voltage grid on floors of the at least one food tray;

a high voltage amplifier electrically connected to the low voltage power source and configured to amplify the low voltage signal to a high voltage electrical signal between 20,000 and 50,000 VDC;

positive and negative connectors electrically connected to the high voltage grid and extending up walls of the at least one removable food tray and making electrical contact with housing connectors when the at least one food tray is placed inside the housing, the housing connectors electrically connected to the high voltage amplifier; and a momentary switch inside the housing accessible by opening a top cover of the housing, the momentary switch configured to momentarily electrically connect the high voltage electrical signal from the high voltage amplifier to the high voltage grid, the high voltage electrical signal sufficient to euthanize rodents in the housing bottom.

16. The electric rodent trap of claim 1, wherein the high voltage grid comprises alternating electrodes reaching across a housing floor of the housing.

17. The electric rodent trap of claim 1, wherein the at least one food tray is removable from the housing.

18. The electric rodent trap of claim 1, wherein the at least one food tray comprises two removable food trays.

\* \* \* \* \*